Nov. 12, 1929.　　　　O. W. MILLER　　　　1,735,541
HAND TRUCK
Filed Aug. 25, 1928　　　2 Sheets-Sheet 1
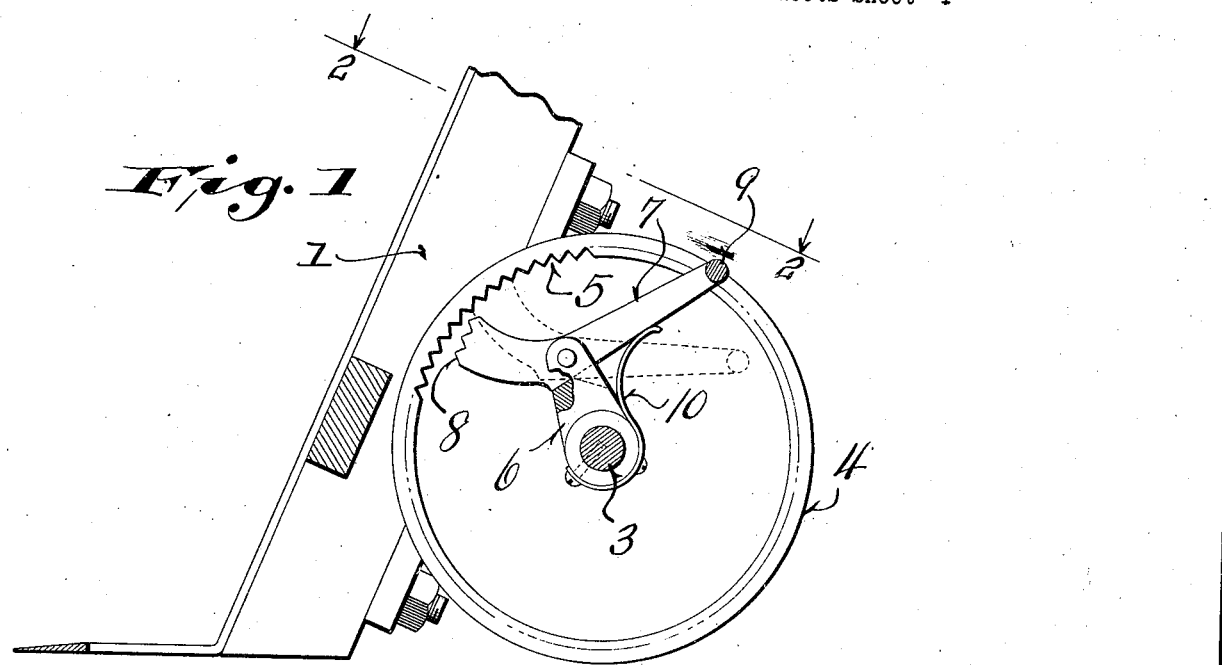
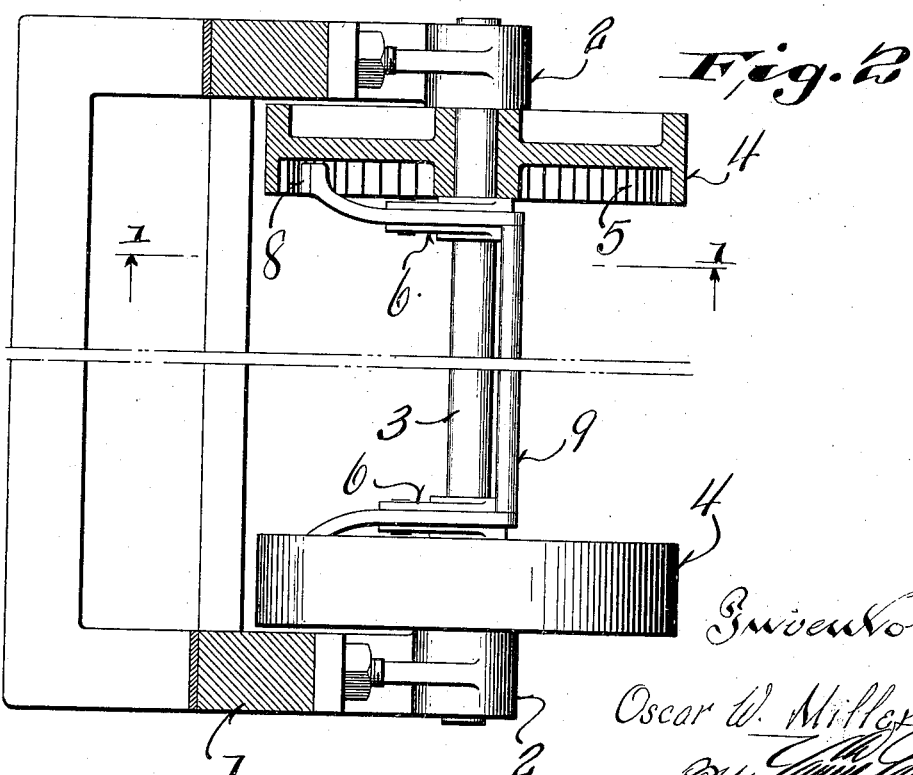
Inventor
Oscar W. Miller Nov. 12, 1929.  O. W. MILLER  1,735,541
HAND TRUCK
Filed Aug. 25, 1928   2 Sheets-Sheet 2
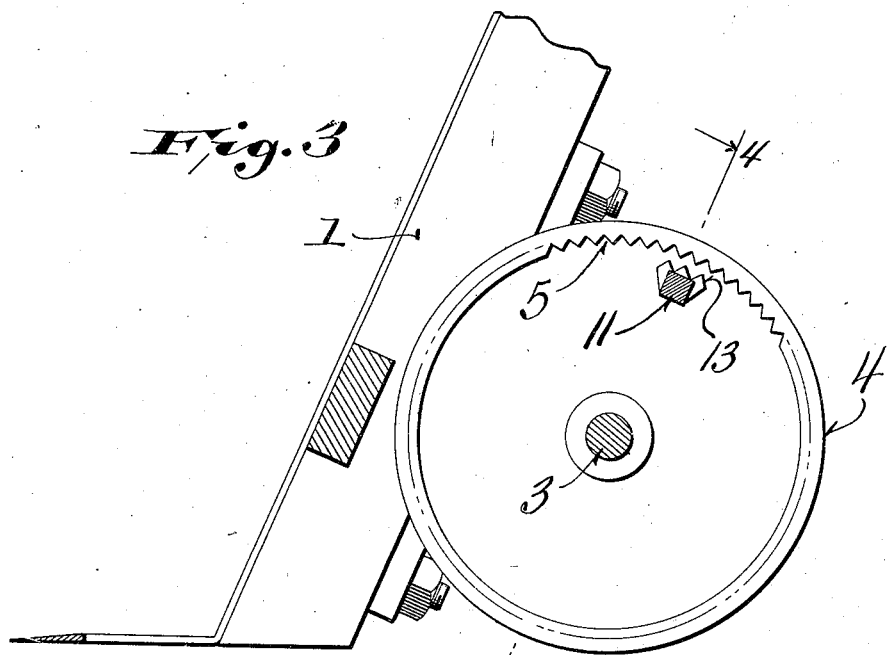
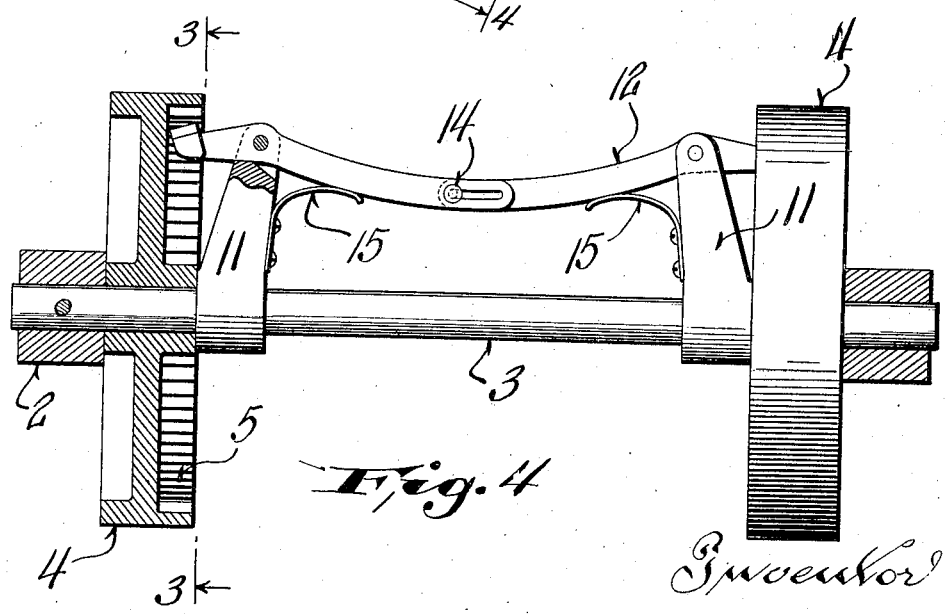
Inventor
Oscar W. Miller Patented Nov. 12, 1929

1,735,541

UNITED STATES PATENT OFFICE

OSCAR W. MILLER, OF APPLETON, WISCONSIN

HAND TRUCK

Application filed August 25, 1928. Serial No. 302,013.

This invention relates to hand trucks, and is particularly directed to a two wheel hand truck.

Objects of this invention are to provide a novel form of hand truck in which means are provided, operable by the foot of the operator for positively locking the wheels against motion, and in which the interlocking may be readily accomplished in an easy and effective manner.

Further objects are to provide a hand truck in which the wheels are provided with flanges having teeth on their inner peripheral faces, and in which a pair of levers simultaneously operable by the foot of the operator, are provided with teeth adapted to interlock with the teeth of the wheels to thus positively lock the wheels.

Further objects are to provide a very simple and strong construction which may be cheaply made and which does not require a material modification of the standard type of truck.

Embodiments of the invention are shown in the accompanying drawings in which:

Figure 1 is a longitudinal sectional view through the lower portion of a truck, showing the construction, such view corresponding to a section on the line 1—1 of Figure 2;

Figure 2 is a sectional view on the line 2—2 of Figure 1;

Figure 3 is a view corresponding to Figure 1, showing a modified form of construction, such view corresponding to a section on the line 3—3 of Figure 4;

Figure 4 is a sectional view on the line 4—4 of Figure 3.

Referring to the drawings, particularly Figures 1 and 2, it will be seen that the truck comprises a main frame 1 of standard construction. This frame carries a pair of brackets 2 which rigidly carry the axle 3. The axle revolubly supports a pair of wheels 4, each of the wheels is provided with an inwardly directed flange having a plurality of teeth 5 on its inner peripheral face.

The axle 3 rigidly carries a pair of brackets 6 which are slotted at their upper ends to provide lips between which levers 7 are pivotally mounted. These levers are provided with teeth 8 at their forward ends and are joined by a transverse rod 9 at their rear ends. This rod 9 is adapted to be engaged by the foot of the operator to thus rock the teeth 8 into interlocking engagement with the teeth 5. Springs 10 are carried by the brackets 6 and bear against the levers 7, such springs normally holding the levers out of interlocking engagement.

It is to be noted also that the brackets 6 serve as inner collars to prevent inward movement of the wheels upon the axle. It is preferable to so form the brackets 6 that they provide stops for arresting the motion of the levers 7, as shown in Figure 1.

Substantially the same construction is illustrated in Figures 3 and 4, except that the brackets 11 corresponding to the brackets 6 carry transversely extending levers 12. These levers are provided with teeth 13, adapted to engage the teeth 5 of the wheels, and are arched inwardly. The inwardly arched ends of the levers 12 are connected slidably in any suitable manner, as by means of the pin and slot construction 14. The levers 12 are urged into inoperative position by means of the springs 15 carried by the brackets 11.

In using this device, the operator merely places his foot on the transverse portion or central portion of the levers 12, and thus simultaneously rocks both levers into interlocking position with the teeth of the wheels. The wheels are thus positively locked in both constructions whenever the operator manipulates the levers.

In the form shown, the levers are intended for operation by the foot of the operator. However, it is apparent that other means may be provided for operating the levers, for instance, a hand rod or similar construction, without departing from the spirit of the invention.

It will be seen that a very simple type of positive lock for the wheels of a hand truck has been provided by this invention which will insure against rotation of the wheels in a positive and effective manner. It will also be seen that this locking means may be most easily operated without any inconvenience whatsoever to the operator.

Although the invention has been described in considerable detail, such description is intended as illustrative rather than limiting as the invention may be variously embodied and as the scope of such invention is to be determined as claimed.

I claim:

1. A hand truck comprising a frame, an axle rigidly supported from said frame, a pair of wheels carried by said axle, a pair of brackets carried by said axle, a pair of levers pivotally carried by said brackets, said wheels having teeth formed therein, said levers having toothed portions adapted to interlock with the teeth of the wheel, and means actuable by the operator to cause interlocking of said levers and wheels.

2. A hand truck comprising a frame, a pair of brackets carried by said frame, an axle carried by said brackets, a pair of wheels revolubly mounted upon said axle and located between and adjacent said brackets, a second pair of brackets rigidly secured to said axle and located between and adjacent said wheels, said wheels having flanges provided with teeth on their inner peripheral faces, a pair of levers pivotally carried by said second mentioned brackets and having teeth adapted to interlock with the teeth of said wheel, and means operable by the foot of the operator for causing said levers and wheels to interlock.

In testimony that I claim the foregoing I have hereunto set my hand at Appleton, in the county of Outagamie and State of Wisconsin.

OSCAR W. MILLER.